Jan. 27, 1931.  B. H. MOSSINGHOFF  1,790,628
TRANSMISSION CONTROL
Filed Jan. 10, 1925   2 Sheets-Sheet 1
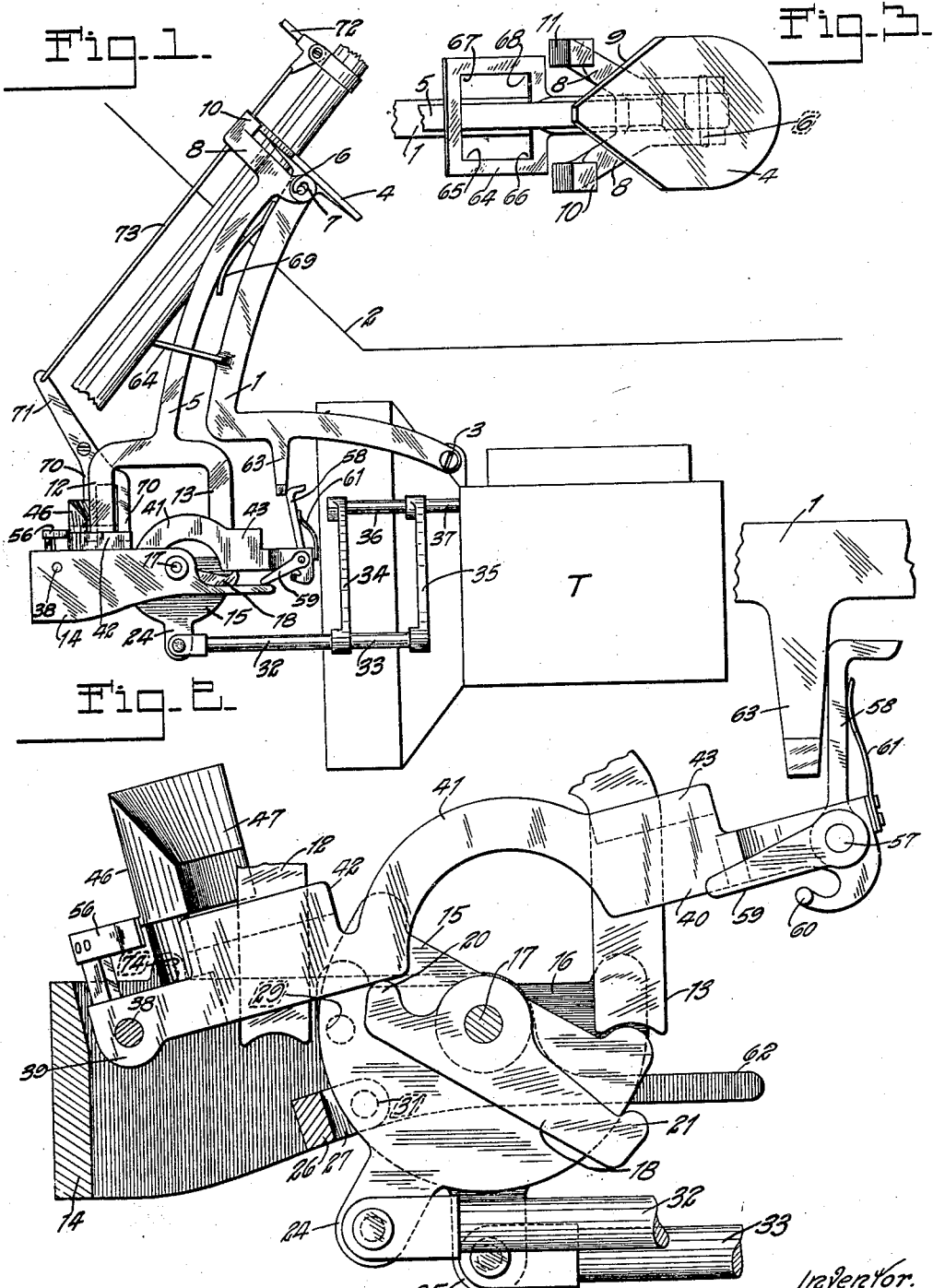

Jan. 27, 1931.    B. H. MOSSINGHOFF    1,790,628
TRANSMISSION CONTROL
Filed Jan. 10, 1925    2 Sheets-Sheet 2
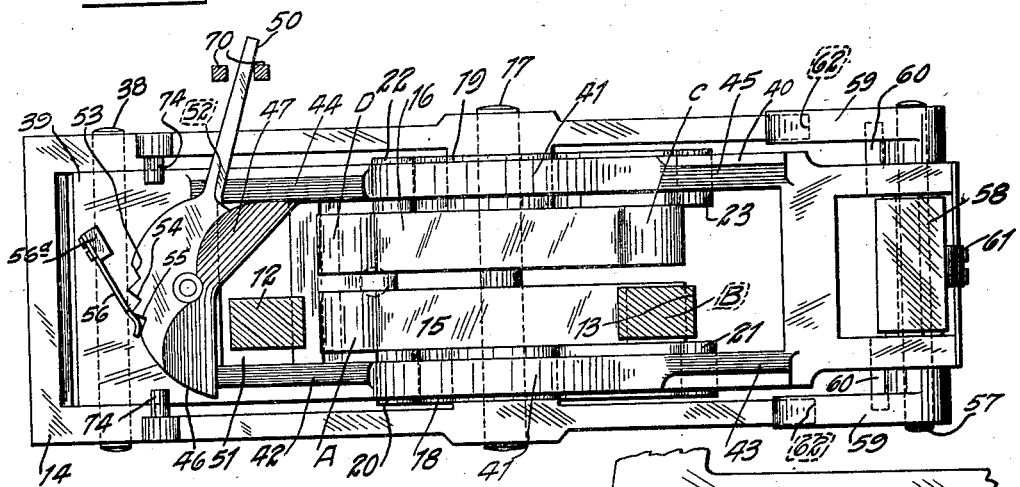
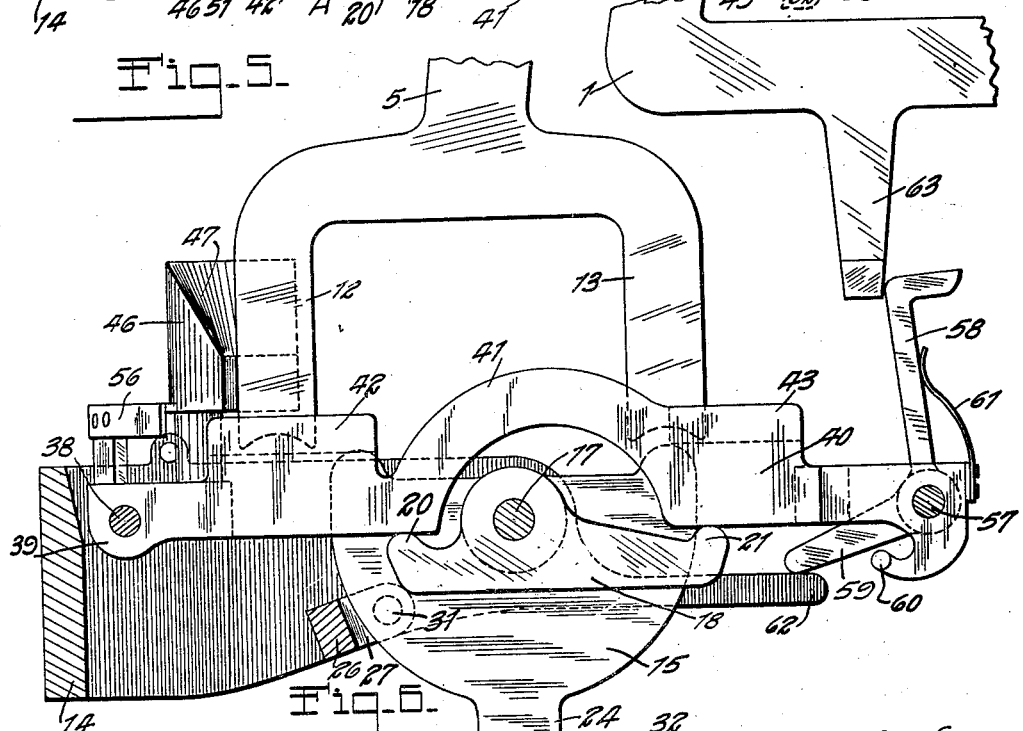
Inventor.
BERNARD H. MOSSINGHOFF.
By Cornwall, Bedell James
Attorneys.

Patented Jan. 27, 1931

1,790,628

UNITED STATES PATENT OFFICE

BERNARD H. MOSSINGHOFF, OF ST. LOUIS, MISSOURI, ASSIGNOR, BY MESNE ASSIGNMENTS, TO PROGRESSIVE MOTOR DEVICES CORPORATION, OF CHICAGO, ILLINOIS, A CORPORATION OF ILLINOIS

TRANSMISSION CONTROL

Application filed January 10, 1925. Serial No. 1,527.

My invention relates to new and useful improvements in automobile transmission control mechanisms wherein the clutch pedal is utilized, aside from its ordinary function, as a transmission control. An example of this type of control is illustrated and described in Patent No. 1,486,447 issued to me March 11, 1924, and in my copending application Serial No. 1528 filed by me January 10, 1925, for Transmission controls.

The principal objects of my invention are to provide a pedal speed change selecting device that is simple, convenient and practical in operation and construction and comparatively cheap to manufacture; to provide a single operation speed change and clutch control wherein the forward stroke of the foot operates the clutch, selects the speed, and engages the determined transmission speed ratio; to provide a simple foot pedal, the bodily depression of which selects one of the speed ratios; to provide a yieldable foot contact-selecting means for other speed ratios; to provide in a combined clutch and speed selecting pedal of the type wherein a speed ratio is disengaged and a new speed ratio engaged on the same positive forward stroke of said pedal means to allow absolute freedom of selection until the time for engaging the speed ratio, accordingly enabling a change of intention on the part of the operator after the initial depression of the clutch pedal; to provide in a combined speed selection and shifting pedal means whereby full depression of the pedal engages a determined speed ratio whereas partial depression of the pedal produces a neutral position; and to provide means as a part of my device to prevent accidental pedal selection of the reversing speed.

With these and other objects in view, my invention consists in certain novel features of construction and arrangement of parts, hereinafter more fully described and claimed, and a preferred form of which is illustrated in the accompanying drawings, in which—

Figure 1 is a side elevational view of my device as applied to an automobile.

Figure 2 is a side view of the parts in position to transmit power.

Figure 3 is a top plan view of the operating pedal.

Figure 4 is a top plan view of my variable speed selector device.

Figure 5 is a view with the side of the fixed frame removed showing the parts in a neutral position.

Figure 6 is a detail view of the segment locking means.

In the drawings, the numeral 1 indicates the clutch operating pedal which extends through floor board 2 and is fixedly mounted on shaft 3. Shaft 3 operates the clutch which may be of any desired type, and the clutch spring (not shown) normally holds the clutch engaged and the shaft 3 in such position that the pedal 1 is at the upper end of its movement as limited by floor board 2 or any other stopping means. The face 4 of the pedal is formed either as an integral part of or rigidly mounted on the arm portion. The two upper corner portions of pedal face 4 are cut away for purposes hereinafter disclosed.

A selector member 5 is pivotally connected to the upper end of clutch pedal 1 by means of pin 6 which is passed through slot 7 in lugs on the selector arm and a coinciding slot in the pedal. Slots 7 are elliptical in shape and have their long axes substantially parallel to the main body of selector member 5. The upper end of selector member is bifurcated to form two fingers 8 and 9 which extend in substantially the plane of the pedal face 4 to the cut away corners and there terminate in lugs 10 and 11 which normally lie slightly below the surface of pedal face 4. The lower end of the selector member is also bifurcated to form two spaced parallel fingers 12 and 13.

The variable speed power transmission controlling device is located in frame 14 which is rigidly secured to any desirable fixed part on the automobile. This frame is U-shaped in cross section, being open at the rear end, the top, and bottom. Two sectors 15 and 16 are freely mounted on shaft 17. Shaft 17 is in turn mounted in the fixed frame 14. Contact surfaces A and B, and C and D are provided on the horizontal ends of these sectors. Neutralizing members 18 and 19 are either formed integrally with sectors 15 and 16, respectively, or attached to operate therewith as desired. These members are on the outer surface of each of the sectors and are provided with two contacting surfaces each 20, and 21 on member 18 and 22 and 23 on member 19. Contacting surfaces 20 and 22 are located forwardly of and closer to the axis of shaft 17 than surfaces 21 and 23. Lugs 24 and 25 are provided on the lower edges of sectors 15 and 16, respectively. A cross member 26 is provided in frame 14 and located slightly forward of sectors 15 and 16 and lower than shaft 17. A projection 27 having an opening 28 therein extends from cross member 26 between the two sectors. Each of sectors 15 and 16 is provided with a semi-spherical depression 29 and 30, these depressions being so located that when the top surfaces of the sectors lie in a horizontal plane they will coincide with the opening 28 in projection 27. A ball 31 is carried in opening 28 and held in position by the depressions 29 and 30 in such a way that any movement of one of the sectors from this predetermined position lodges the ball 31 firmly into the depression of the companion sector and locks it in this position.

Rods 32 and 33 form connections between lugs 24 and 25 and arms 34 and 35, respectively. These arms 34 and 35 connect to extensions on gear train engaging bars 36 and 37 illustrated as standard shifting bars in an ordinary automobile transmission box T, although it is understood that these connections may be utilized for any type of variable speed power transmitters.

A second transversely disposed shaft 38 is located near the enclosed end of the fixed frame 14 and a floating frame 39 is pivotally mounted on this shaft. Frame 39 is rectangular in cross section and lies within the fixed frame 14 but extends beyond the open end thereof. The side members 40 of this floating frame are arched at 41 to clear shaft 17. They are sufficiently spaced to clear the sectors 15 and 16 and lie in the same vertical planes with the neutralizing members 18 and 19. Inclined surfaces 42, 43, 44 and 45 are provided on upwardly projecting lugs which are preferably integrally formed with the frame 39. These inclined surfaces act as guiding members and slant downwardly toward the interior of the floating frame.

A shiftable guide member 46 is mounted on floating frame 39 on the pivotally mounted enclosing end member thereof. The inclined surfaces 47 of guide 46 forms an oblique angle of approximately 135 degrees at its lower edge. The guide 46 is so mounted that it extends partially over the central opening in frame 39 and is shiftable by means of arm 50 so that it may extend over either or both of the corners 51 and 52 of frame 39 and block access thereto. Stops 53, 54 and 55 are provided in the back side of this piece for yieldable engagement by a blade spring 56 which is mounted on lug 56ª of frame 39. These stops are so located that when stop 53 is engaged by blade spring 56, corner 51 is blocked. When stop 54 is engaged, both corners are blocked and when stop 55 is engaged corner 52 is blocked.

Near the free end of frame 39 a transverse pin or shaft 57 is provided to which is fixed an upstanding arm 58 located between the sides 40 of the frame. Tripping arms 59 which lie in a plane inclined to the horizontal are also fixed to shaft 57 but exteriorly of said members 40. The sides 40 of frame 39 are continued slightly downwardly and back under their main body portions to form stopping lugs 60 to limit the downward movement of arms 59 and consequently forward movement of upstanding arms 58.

Blade spring 61 is attached to the free end of frame 39 and bent to bear against upstanding arm 58 and normally hold it at the forward limit of its movement. The horizontal arms 59 are aligned with and adapted to strike against the portions 62 of fixed frame 14 upon depression of the floating frame 39. A downwardly depending lug 63 is preferably formed as an integral part of the horizontal portion of the clutch operating pedal 1. This lug is so located that its arc of movement intersects the top surface of upstanding arm 58. This movement of the parts causes lug 63 upon depression of the clutch pedal 1 to contact with upstanding arm 58 and further movement thereof to depress the floating frame 39 until the horizontal arms 59 are tripped by surfaces 62 to break the direct connection between clutch operating pedal 1 and the floating frame.

A guide plate 64 having a rectangular opening with corners therein numbered 65, 66, 67 and 68 is fixed to the clutch operating pedal and selector member 5 is passed therethrough. A blade spring 69 normally holds the selector against the forward edge of the guide plate. This guide plate is utilized to limit the movement of the fingers 12 and 13 on the free end of the selector member 5. Manual control of the shiftable guide member 46 is obtained by means of a bell crank mounted on the steering column or any other suitable location. Forked end 70 of the bell crank encloses arm 50 of guide 46. The arm 71 of the bell crank is connected to hand lever 72 by rod 73. An indicating dial may be provided with member 72 to show the position of the guide 46 but for a simple illustration it is to be understood that this position may be determined by feeling the engagement of spring 56 in the various notches.

Lugs 74 are provided on the top side of the fixed frame 14 to limit movement of floating frame 39.

To operate the selector member 5 to engage the first or low speed gear ratio, the operator of the automobile places his foot on the face floor of clutch pedal 1 so that it is tilted toward the upper left hand corner and contacts with the lug 10 of the selector. The contact of the foot with lug 10 depresses blade spring 69 and causes the selector to seek corner 68 of guide 64. The necessary side movement is permitted by the elliptical openings 7 in the lugs by which the selector is mounted. With the selector in corner 68 of guide 64 the finger 12 of this member is directed to strike against surface D of the sector 16 in its arcuated course of movement and finger 13 will enter the space to the rear of surface C on this same segment. To direct the selector for the engagement of the second or intermediate speed ratio, lever 72 should be in its foremost position as shown in Figure 1 to cause the shiftable guide 46 to be positioned as in Figure 4 blocking the corner 52. The foot is placed flatly against the pedal and neither of lugs 10 or 11 will be touched since they lie slightly below the surface of the pedal face. The selector 5 is now held in a forward position by blade spring 69 and depression of pedal 1 will cause the finger 12 to slidingly contact with guiding face 47 and direct it into the space between guide 46 and the forward end of segment 15 as illustrated in Figure 4. Finger 13 of the selector will now contact with the surface B of sector 15 and the body portion of the selector rod 5 will be in the corner 65 of the guide 64.

To direct the selector to engage third or high speed gear ratio, the operator's foot is tilted against the upper righthand corner of the pedal face to contact with lug 11 of the selector. Contact with this lug depresses spring 69 and directs the selector into corner 66 of the guide 64. In this position, the finger 12 is aligned to contact with surface A of sector 15 and finger 13 will enter the space to the rear of this sector.

To direct the selector to engage the reversing gears, the lever 72 is first shifted rearwardly or toward the driver so that the shiftable guiding member is moved into a position to obstruct corner 51 and leave corner 52 free. In this position the blade spring 56 will engage stop 53 of the shiftable guiding member. The operator again places his foot flatly upon the face of the clutch pedal as in selecting the second or intermediate gear ratio. The spring 69 holds the selector rod against the forward edge of the guide. Upon depression of the clutch pedal, the finger 12 strikes the inclined guiding face 47 of guide 46 and is directed into corner 52. The finger 13 thereupon contacts with surface C of segment 16.

The drawings illustrate the operation of the device during the engagement of the second or intermediate speed gear ratio and the description of the operation will accordingly follow these movements for the purpose of clearness, although it is to be understood that the engagement of any other gear train is obtained in a similar manner.

With the parts in a neutral position as shown in Figure 5, the clutch pedal is depressed by placing the foot flatly upon the pedal. The first three-quarters of this movement it idle in so far as the transmission control mechanism is concerned and merely disengages the clutch. After the clutch pedal has traveled three-quarters of its movement, the selector 5 with its fingers 12 and 13 is located as shown in Figure 5. Further depression of the pedal causes finger 13 to move segment 15 upon the shaft 17. This motion is transmitted from the lug 24 of the segment through rod 32 and arm 34 to the shifting bar 36 and causes the engagement of the selected gear train. As segment 15 is rotated the member 18 is moved therewith. The contact surface 20 of this member strikes the side 41 of frame 49 and moves it upon its shaft to an inclined position as shown in Figure 2. The movement of segment 15 also forces the locking ball 31 into the depression 30 of segment 16 and prevents any movement of the companion segment.

The release of the clutch pedal is idle in so far as the gear controlling mechanism is concerned except that the selector member is withdrawn from contact with the remainder of the mechanism.

With the gears engaged and movement of the clutch pedal through the first half of its arc again merely disengages the clutch but the floating frame 39 is now in an inclined position and the upstanding arm 58 is in the path of movement of the lug 63 which depends from the clutch pedal. In the third quarter of the movement of the clutch pedal, the lug 63 strikes the arm 58 and depresses the free end of the floating frame 39 until the horizontal arm 59 is tripped by contact with the surface 62 of the fixed frame to force the upstanding arm 58 from the path of lug 63. The downward movement of the sides 41 of floating frame 39 brings them into contact with any of the surfaces 20, 21, 22 or 23 which may have been raised above their normal position by the movement of their sector during the engagement of gears. Further movement of the sides 41 after contact with any of these surfaces will carry with it these neutralizing members and consequently the sectors to which they are fixed until all of these contact surfaces lie in the same horizontal plane. With this condition the parts are as shown in Figures 1 and 5 and there is no engagement with any of the gear trains. The last quarter movement of the pedal is a gear engaging movement as heretofore described.

There are two methods of providing a neutral position for any transmission control mechanism, the first or most common of which may be referred to as a pedal neutral. This may be obtained by the operator by depressing the clutch pedal approximately through three-quarters of its movement or to a point where the sectors 15 and 16 have been positively set in a neutral position and thereby releasing the clutch pedal. To obtain this neutral, it is necessary that the operator be able to feel the exact point at which the gear train becomes disengaged. The other or more positive neutral is obtained by setting the lever 72 in an intermediate position so that the shiftable guide 46 blocks both of the corners 51 and 52. In this position blade spring 56 engages stop 54. Upon depression of the clutch pedal by the operator, sufficient movement of the parts is permitted to allow a complete depression of the floating frame 39 and restore the sectors 15 and 16 to a neutral position if either of them have been displaced. A further movement, however, is prevented due to the fact that finger 12 of the selector is directed to a position approximately over both of the sectors 15 and 16. Contact with both of the sectors at the same time will lock the device against further downward movement and thus provide a positive neutral position. To obtain this neutral it is necessary to place the foot flatly upon the pedal.

It will be readily understood that minor changes in the form and construction of the various parts of my improved transmission control mechanism may be made and substituted for those herein shown and described, without departing from the spirit of my invention.

I claim:

1. In a transmission control, a clutch pedal, a selector member attached to said clutch pedal, speed ratio engaging means adapted to be actuated by said selector member, and a manually shiftable guide to prevent accidental engagement of the reversing speed.

2. In a transmission control, a clutch pedal, a selector member attached to said clutch pedal, speed ratio engaging means adapted to be actuated by said selector member, and a shiftable guide, said guide being normally located to block operative contact of said selector member with a determined speed ratio engaging means.

3. In a transmission control, a clutch pedal having a rigid foot contacting face for clutch operation, a selector member, said selector member being attached to said pedal for limited universal movement selectively in respect to said face, speed ratio engaging means adapted to be actuated by said selector member, and yieldable means normally operating to direct said selector member for the engagement of a predetermined speed ratio.

4. In a transmission control, a pedal lever a selector mounted for universal movement on said lever, speed ratio engaging means adapted to be actuated by said selector on its downward stroke, and yieldable means normally operating to direct said selector for the engagement of a determined speed ratio.

5. In a transmission control, a pedal, a selector, said selector being attached to said pedal for limited universal movement, speed ratio engaging means adapted to be actuated by said selector, and projections on said selector for its selective operation, said projections lying lower than and beyond the surface of said pedal.

6. In a transmission control, a pedal having a rigid face, a selector member attached to said pedal, projections on said selector member lying beyond the edge of and slightly lower than the face of said pedal, said projections being adapted for foot contact by the operator to direct the selector member, and speed ratio changing means adapted for operation by said selector member.

7. In a speed-change device, a transmission having a shift bar, a speed ratio changing mechanism comprising a sector mounted upon a shaft for limited rotatable movement, a lug on the periphery of said sector, and a rod connecting said lug and said shift bar, a pedal, a selector operable with said pedal, and means to cause a variety of contact engagements between said selector and said sector.

8. In a transmission control, speed ratio controlling means, a clutch pedal, means on said clutch pedal coacting with said speed ratio controlling means to produce a neutral position in the transmission upon partial depression of said clutch pedal, and selection means operable during and prior to said neutral position of said speed ratio controlling means.

9. In a transmission control, a clutch pedal with connections to disengage the clutch with every depression of said pedal, speed changing mechanism, a rod mounted on said pedal normally remote from said speed change mechanism, and foot contact means adapted to move said rod for speed selection, said rod operatively engaging said mechanism to effect speed change engagement upon depression of said pedal.

10. In a transmission control, a speed change mechanism including two members pivoted intermediate their ends and a pedally settable selection means movable for operating contact with either one of said pivotally mounted members selectively at either of the ends of said members.

11. In a transmission control, a speed change mechanism including two members pivoted intermediate their ends, and a movable pedally settable selector having its end bifurcated to form two spaced contact points adapted for operating contact with either end of either one of said pivotally mounted members.

12. In a transmission control, a pedal, a speed selector on said pedal speed change mechanism operable by said selector, and additional selector means apart from said pedal for directing reverse speed selection.

13. In a transmission control, a pedal, a speed selector on said pedal speed change mechanism operable by said selector, and manual control means for reverse speed selection.

14. In a control for a transmission having speed engaged and neutral positions, a pedal, speed selection means operable with said pedal, additional selection means apart from said pedal for selecting neutral position and mechanism for effecting the selected speed change.

15. In a transmission control having speed engaged and neutral positions, a pedal, speed selection means mounted movably on and selectively operable by the foot operating said pedal operable with said pedal, and single auxiliary means for selecting the reverse and neutral positions.

16. In a transmission control, a pedal having a face, a selector mounted for operation with said pedal, lugs adapted for contact by the operator's foot upon the pedal face to direct said selector, means for engaging the speed directed by said selector, and yielding means to direct said selector when there is no contact with said lugs.

17. In a transmission control, a pedal having a face, a selector mounted for operation with said pedal, lugs adapted for contact by the operator's foot upon the pedal face to direct said selector, means for engaging the speed directed by said selector, and yielding means to direct the engagement of an intermediate speed when there is no contact with said lugs.

18. In a transmission control, a pedal having a pedal controlling face immovable as to selection, speed change mechanism, and speed selection means mounted on said pedal and selectively settable for speed determination completely by substantially the same directional foot movement depressing said pedal and adapted to actuate said speed change mechanism.

19. In a transmission control having speed engaged and neutral positions, a speed changing mechanism including a pedal having a rigid foot contacting face, a foot contact surface fixed immovably on said pedal, speed selection means on said pedal movable into a plurality of speed selection positions in respect to said surface, and an auxiliary control to select neutral position, and means whereby partial depression of said pedal effects said neutral position independently of said auxiliary control.

20. In combination, a transmission, a clutch pedal, speed change means directly engageable by movement of said pedal, speed determining means selectively operable for a plurality of completely selected speeds by the single foot movement depressing said pedal, dual shifting means in said transmission, and dual communication means between said shifting means and said speed determining means.

21. In a transmission control, a clutch pedal pivotally mounted for oscillation, a selector means mounted for operation with said pedal and movable for complete selection during the mere declutching movement of said pedal, by the substantially same directional foot pressure operating said pedal, speed change mechanism, and means locking said selector against selective movement during the speed engaging period.

22. In a driving ratio change device, speed ratio change means, a pedal adapted to actuate said means for a complete ratio change during its substantially forward stroke, and speed selection means determinable for a desired one of a plurality of ratios solely by the substantially same directional foot pressure operating said pedal.

23. In a transmission control for at least a duality of ratio positions, speed ratio engaging means, an automobile normal control pedal having supplemental means adapted to control the operation of said engaging means for a full ratio change during its substantially forward stroke, and speed selection means determinable completely for either of said duality of positions by substantially the same directional foot pressure operating said pedal.

24. In a motor vehicle, a freely selective speed change device for three or more speed ratios, comprising pedal means, means operable by said pedal means to effect a complete speed change by its substantially forward movement, and means whereby substantially the same directional movement of the foot is adapted completely to select for any of said plurality of speeds and operate said pedal.

25. In a driving ratio change device for automobiles, a foot operated controller, ratio change shifting mechanism constructed so as to effect a complete ratio change upon the forward movement of said controller, ratio selecting means movable with and operable by the foot operating said controller, a plurality of selective foot contact portions on said means, the pressure of the foot selectively on said portions determining the ratio selection, said ratio selection and said controller operation being actuable substantially by the same directional pressure of the operator's foot.

26. In a driving ratio change device for automobiles, a clutch, a pedal controller controlling said clutch and having an operating face immovable with respect to selection, ratio change effecting mechanism actuable for a complete ratio change by the unidirectional movement of said controller, the connections between said clutch and said mechanism and said controller being such that the initial forward movement of the controller merely disengages the clutch, ratio selecting means operable by the foot with said controller, which selection means includes a plurality of relatively movable foot contact portions for a plurality of ratio selections, such portions being relatively movable by the foot during the clutch disengaging operation of said controller.

27. In a driving ratio change device for automobiles, a clutch pedal, ratio change effecting mechanism constructed for complete ratio change operation by the forward stroke of said pedal, ratio selecting means associated with and mounted in respect to said pedal as to be operable by the foot when operating said pedal, a plurality of foot engageable selecting surfaces on said means adapted for a diversity of selective foot engagements for diverse ratio selections, said means being constructed so that the solely forward pressure of the foot selectively on said surfaces moves said means selectively to determine the speed selection and further pressure thereagainst in the same direction moving said pedal to disengage the clutch and effect a complete change into the newly selected driving ratio.

28. In a gear ratio change device for automobiles, a clutch pedal, ratio change effecting mechanism constructed and having connections for complete ratio change actuation by the forward movement of said pedal, foot operated ratio selection mechanism operable by the foot when operating said pedal, a gear neutralizing mechanism with connections for positive actuation by said pedal, and a mechanical latch means to disconnect said connections, said latch being operable for disconnection by a partial forward stroke of said pedal.

29. In a gear ratio change device for automobiles, a clutch pedal, ratio change effecting mechanism constructed and having connections for complete ratio change actuation by the full forward movement of said pedal, a pedal surface for foot contact mounted immovably as to selection on said pedal, foot operable ratio selection means associated with and selectively movable in relation to said surface by the foot operating said pedal, a partial forward movement of said pedal disengaging the clutch and associated means bringing the gear ratio to neutral driving position during the partial movement.

30. In a gear ratio change device for automobiles, a pedal controller, a foot engageable surface mounted on said controller immovably as to ratio selection, ratio change mechanism actuated by said controller, including ratio change shifting mechanism for low intermediate and high speed gear ratios, ratio selection mechanism including selector means associated with said controller and mounted to be selectively movable in respect to said controller for selecting low and high speeds by the foot operating said controller, and a pressure device associated with said selection mechanism automatically urging selection of an intermediate gear ratio when the foot functions on said immovable surface to operate said controller.

31. In a gear ratio change device for automobiles, a clutch pedal lever, a foot engageable surface mounted on said lever immovably as to ratio selection, ratio change effecting mechanism actuated for a complete ratio change by the depression of said lever and including ratio change shifting mechanism for low and high speed gear ratios, ratio selecting mechanism including a single selector means associated with said lever and having a duality of selective foot contact surfaces movable by the foot selectively in relation to said immovable surface for selecting either of a duality of ratios, both said movable surfaces being constructed as substantially spaced apart to both sides of said immovable surface the foot operating said selection means operating said lever to complete the ratio change.

32. In a transmission control, a clutch pedal, a selectively foot controlled selector member attached to said pedal, speed ratio engaging means adapted to be actuated by said selector member, and hand controlled means to direct said selector into definite ratio changing positions.

33. In a driving ratio change device, ratio change mechanism, a clutch pedal operatively associated with said mechanism so as to first disengage the clutch, means to then disengage the ratio elements and means to then engage new ratio elements, all in one direction of movement of said pedal, ratio selection means operable by the foot operating said pedal, and yieldable means automatically directing engagement of a determined ratio.

34. In a ratio change device for automobiles, a clutch pedal, having a rigid face for clutch operation, a selector member, said selector member being attached to said pedal for limited universal movement selectively in respect to said face, and speed ratio engaging means adapted to be actuated by said selector member.

35. In a driving ratio change device for an automobile, a foot controller or the like to control the ratio change, ratio change effecting mechanism controllable for a complete change by the one direction of motion of said controller, and ratio change selection means including a foot contact surface mounted on said controller immovably as to selection, and foot engageable selector means movable into definite ratio selective positions in respect to said surface, the foot operating said controller also operating said foot engageable means.

36. In a driving ratio change device, a foot operated controller to control the ratio change, a ratio change effecting device actuated for a complete ratio change by the full depression of said controller and ratio change selecting means on said controller, including a pedal surface for operating said controller mounted immovably as to selection on said controller, foot engageable definite ratio selector means movable in respect to said pedal surface, the pressure engagement of the foot on said surface and on said selector means selectively determining the particular ratio selection.

37. In a driving ratio change device, a foot operated controller to control the ratio change, a ratio change effecting device controllable for a complete ratio change by the full depression of said controller and ratio change selecting means on said controller, including a pedal surface for operating said controller mounted immovably as to selection on said controller, foot engageable definite ratio selector means movable in respect to said pedal surface, the pressure engagement of the foot on said surface and on said selector means selectively determining the particular ratio selection, and associated means moving said controller for ratio neutralizing operation by the partial depression of said controller.

38. In a mechanical driving ratio change means, a clutch pedal lever and ratio change selecting device including a pedal surface for foot contact immovably mounted in respect to selection on said lever, mechanism having a plurality of foot engageable surfaces on said lever movable in relation to said pedal surface, the pressure engagement of the foot selectively with said various surfaces operating said mechanism to determine the definite ratio selection, and a ratio change effecting device controllable for a complete ratio change by the unidirectional movement of said lever.

39. In a driving ratio change device for automobiles, a clutch pedal lever, and a ratio effecting mechanism for the ratio change, comprising a device mounted on and positionable for complete selection with the single foot movement operating said lever, and change completing means, both of said means being normally out of mutual engagement, the bodily movement of said lever causing functional engagement of said means to complete the ratio change.

40. In a driving ratio change device for motor vehicles, a pedal controller to operate the ratio change, ratio selection mechanism on said controller, including a single foot engageable selector member on said controller, said member having a single selector rod pivotally mounted so as to be movable laterally into any one of a plurality of completely selective ratio positions, and a ratio change effecting mechanism controlled for a complete ratio change by the longitudinal movement of said rod.

41. In a driving ratio change device for motor vehicles, a clutch pedal, a change effecting device controllable for a complete ratio change by the depression of said pedal, ratio selecting means associated with and mounted movably selectively in respect to said pedal for a plurality of completely selectively diverse pressure engagements by the foot operating said pedal, the selective foot pressure engagement portions of said means normally lying substantially in the same plane.

42. In a driving ratio change device for motor vehicles, a clutch pedal, a change effecting device actuable for a complete ratio change by the depression of said pedal, foot operated mechanical ratio selection means including a plurality of selectively movable foot engagement members on said pedal for selective foot engagement, the engagement portions of said members lying substantially in the same plane constantly during the clutch engaged position of said pedal, and ratio selection means selectively positionable by foot engagement on said members.

43. In a driving ratio change device for an automobile, foot operated ratio selection means, comprising a clutch pedal lever or the like disengaging the clutch during its initial depression, a plurality of relatively movable foot engagement members on said lever for selective foot engagement, the engagement surfaces of said members being constructed and positioned in relation to each other to allow the foot to engage any two adjacent surfaces simultaneously during the clutch disengaging movement of said lever, and a ratio change effecting device controllable for a complete ratio change by the substantially unidirectional movement of said lever.

44. In a mechanical driving ratio change device for an automobile, foot operated mechanical ratio selection means, comprising a pedal lever or the like, a plurality of relatively and selectively movable foot engagement members on said lever for selective foot engagement, the foot engagement portions of said members being constructed and positioned in relation to each other as to allow the foot to engage any two adjacent surfaces simultaneously at any time, the pressure engagement of the foot relatively positioning said members for ratio selection, and a ratio change effecting device controllable for a complete ratio change by the full depression of said pedal and for ratio neutralizing by the partial depression of said lever.

45. In a device for accomplishing a plurality of driving ratio changes for automobiles, a foot operable controller controlling the actuation of a complete ratio change by its unidirectional movement, and a ratio selection mechanism including a plurality of ratio determining selective foot pressure surfaces operable for a plurality of ratio selections by a plurality of pressure positions of the foot when operating said controller, selection means selectively operable by foot pressure on said surfaces and additional remote ratio selection means operable in other manner than said foot operation.

46. In a driving ratio change device for automobiles, a foot operable controller, a change effecting device controllable for a complete ratio change by the unidirectional movement of said controller, ratio selection means constructed and positioned for selective operation by the foot when operating said controller, and additional remote selection controlling means operable in other manner than said foot operation.

47. In a driving ratio change device for automobiles, a foot operable controller, a change effecting device controllable for a complete ratio change upon the unidirectional movement of said controller, foot operable ratio determining means mounted in respect to said controller for and differently settable by different engagements selectively by the foot operating said controller, and additional hand operated selection controlling means for at least one of the ratios.

48. In a driving ratio change device for automobiles a clutch pedal controller, ratio change effecting mechanism operable for a complete ratio change by the depression of said controller, and mechanical ratio change determining means associated with and selectively operable by the foot operating said controller, which means is constructed and adapted for at least three selective and diverse foot pressure engagements for at least three ratio selections, the pressure of the foot selectively on said means operating to select the ratio and move the controller to disengage the clutch and actuate the complete ratio change.

49. In a driving ratio change device for automobiles, a clutch pedal disengaging the clutch by its initial depression, ratio change effecting mechanism controllable for a complete ratio change by the further depression of said pedal, and a ratio selecting device including means associated with said pedal and positioned as to be selectively movable for a plurality of ratios by selective pressure placement of the foot operating said pedal.

50. In a mechanical driving ratio change device for motor vehicles, a foot operable controller, a change effecting device actuable for a complete ratio change upon unidirectional movement of said controller, and ratio selecting means associated with and mounted so as to be selectively operable by the foot operating said controller and constructed for and differently movable by different selective foot pressure engagements on said controller, said selected foot pressure on said controller determining the ratio and moving the controller to accomplish the complete ratio change as selected.

51. In a mechanical driving ratio change device for automobiles, a clutch pedal, a change effecting device including means controllable for ratio disengagement upon the partial depression of said pedal and means for effecting a new ratio engagement upon further depression of said pedal and ratio selecting means associated with said pedal and mounted so as to be selectively movable for selective ratio determination by selective foot pressure when operating said pedal, and engagement effecting means to effect the selected engagement only after the ratio disengagement movement of said pedal.

52. In a device for selecting and actuating a plurality of driving ratio changes for automobiles, a clutch pedal lever, a primary selecting and shifting means on said lever, operable by the fore part of the foot, a secondary ratio change shifting mechanism, said primary means including a plurality of selection controlling foot pressible portions selectively pressible for adjusting said primary means to register for cooperative selective ratio change shifting adjustment of said secondary mechanism during the operation of the pedal.

53. A ratio change controlling device comprising a clutch pedal, means on said pedal mounted separately from the clutch operating foot contact surface for registering the selective intentions of the operator by the foot operating said pedal and for communicating the registered intentions, means for receiving selectively the selected communications, and means for further communicating the selections to cause the selective operation of a ratio change mechanism.

In testimony whereof I hereunto affix my signature this 8th day of January, 1925.

BERNARD H. MOSSINGHOFF.